UNITED STATES PATENT OFFICE.

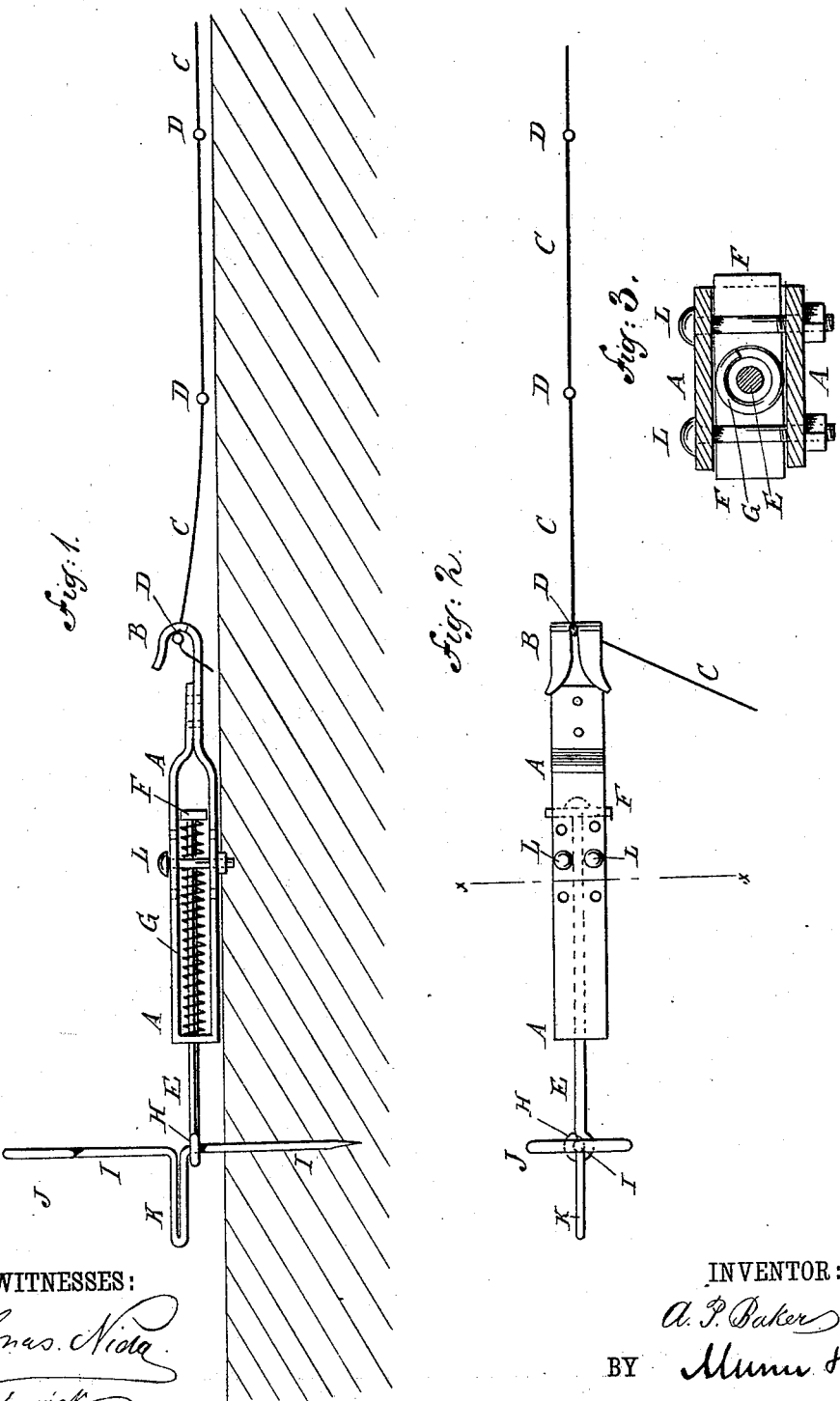

ALBERT PERRY BAKER, OF THAWVILLE, ILLINOIS.

CHECK-WIRE TENSION FOR CORN-PLANTERS.

SPECIFICATION forming part of Letters Patent No. 302,374, dated July 22, 1884.

Application filed November 6, 1883. (No model.)

*To all whom it may concern:*

Be it known that I, ALBERT PERRY BAKER, of Thawville, in the county of Iroquois and State of Illinois, have invented a new and useful Improvement in Check-Wire Tensions for Corn-Planters, of which the following is a full, clear, and exact description.

Reference is to be had to the accompanying drawings, forming a part of this specification, in which similar letters of reference indicate corresponding parts in all the figures.

Figure 1 is a side elevation of my improvement illustrating its use. Fig. 2 is a plan view of the same. Fig. 3 is a sectional end elevation of the same taken through the line *x x*, Fig. 2.

The object of this invention is to give a uniform tension to check-wires, so that the pull of the planters will not draw the buttons of the check-wire out of place, and the planting will be done in accurate check-row.

The invention consists in an open-sided box having a forked hook upon its forward end, and provided with adjustable stop-pins for limiting the tension, and a spiral spring placed upon a rod sliding through a hole in the rear end of the said box, and provided at its forward end with a cross-head to rest against the end of the spring and engage with the stop-pins, and an eye at its rear end to receive the anchor-pin, as will be hereinafter fully described.

A represents the body of the device, which is made in the form of a box open at the sides, and with the hook B, formed upon or attached to its forward end. The hook B is forked, as shown in Fig. 2, so that the check-wire C can be inserted in it, with one of the buttons D resting against the concave side of the said hook, as shown in Figs. 1 and 2.

In the rear end of the box A is formed a hole, through which passes a rod, E, having a cross-head, F, upon its inner end.

Upon the rod E, within the box A, is placed a spiral spring, G, against the forward end of which rests the cross-head F. The rear end of the spring G rests against the inner side of the rear end of the box A.

Upon the outer or rear end of the rod E is formed an eye, H, to receive the anchor-pin I, the lower end of which is pointed, so that it can be readily thrust into the ground.

Upon the upper end of the anchor-pin I is formed a handle, J, and upon its middle part is formed an arm, K, projecting at right angles with the length of the said pin, to serve as a stop to prevent the eye H of the rod E from rising upon the said pin I. The arm K also serves as a foot-rest, so that the operator can use his foot in thrusting the pin I into the ground.

The amount of tension under which the spring G can be placed can be limited by stop-bolts or pins L, passed through holes in the top and bottom of the box A. Several holes are formed in the top and bottom of the box A to receive the stop-bolts or pins L, so that the tension under which the spring G, and consequently the wire C, is placed can be readily regulated.

In using the improvement the wire C is stretched across the field, and at each side of the field the said wire C is placed in the fork of the hook B, with a button, D, resting against the concave side of the said hook B. The rear end of the rod E is then drawn back till the cross-head F strikes against the pins L. The pin I is then passed through the eye H of the rod E, and is thrust into the ground, putting the wire C under such a tension that it will not be drawn out of position by the pull of the planter.

Having thus described my invention, I claim as new and desire to secure by Letters Patent—

1. In a check-wire tension, the combination, with the sliding rod E, having a cross-head upon its forward end and an eye at its rear end, the open-sided box A, and the spiral spring G, of the anchor-pin I, provided with a handle, J, and an arm, K, substantially as herein shown and described, whereby the said tension can be readily secured in place, as set forth.

2. In a check-wire tension, the anchor-pin I, made substantially as herein shown and described, with a handle, J, at its upper end and a projecting arm, K, at its middle part, whereby the said pin can be readily thrust into the ground, and will hold the eye of the sliding rod from rising upon the said pin, as set forth.

ALBERT PERRY BAKER.

Witnesses:
J. C. SHEAR,
CHAS. F. KIMMEL.